(12) United States Patent
Tummala et al.

(10) Patent No.: US 12,542,054 B2
(45) Date of Patent: Feb. 3, 2026

(54) MANAGING VEHICLE BEHAVIOR BASED ON PREDICTED BEHAVIOR OF OTHER VEHICLES

(71) Applicant: QUALCOMM Incorporated, San Diego, CA (US)

(72) Inventors: Gopi Krishna Tummala, San Diego, CA (US); Tianqi Ye, San Diego, CA (US); Avdhut Joshi, Carlsbad, CA (US); Monu Surana, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 244 days.

(21) Appl. No.: 17/455,853

(22) Filed: Nov. 19, 2021

(65) Prior Publication Data

US 2023/0162597 A1    May 25, 2023

(51) Int. Cl.
*G08G 1/01* (2006.01)
*B60W 30/00* (2006.01)
(Continued)

(52) U.S. Cl.
CPC .......... *G08G 1/0125* (2013.01); *B60W 30/00* (2013.01); *B60W 40/04* (2013.01); *H04W 4/40* (2018.02);
(Continued)

(58) Field of Classification Search
CPC .... G08G 1/0125; G08G 1/0965; G08G 1/164; G08G 1/167; G08G 1/163; B60W 30/00;
(Continued)

(56) References Cited

U.S. PATENT DOCUMENTS 9,381,916 B1    7/2016  Zhu et al.
11,157,010 B1 * 10/2021  Narang ................ G05D 1/0219
(Continued)

FOREIGN PATENT DOCUMENTS

EP      3855408 A1    7/2021
WO   2021066862 A1    4/2021

OTHER PUBLICATIONS

IMSL, "What is a Regression Model," 2021. (Year: 2021).*
International Search Report and Written Opinion—PCT/US2022/045010—ISA/EPO—Jan. 24, 2023 18 pages.

*Primary Examiner* — Aniss Chad
*Assistant Examiner* — Stephanie T Su
(74) *Attorney, Agent, or Firm* — Muncy, Geissler, Olds & Lowe, P.C.

(57) ABSTRACT

Various embodiments include methods and systems for managing vehicle behavior. In some embodiments, a vehicle processor of the first vehicle may receive dynamic traffic flow feature information relevant to movements of a second vehicle within a predetermined proximity to the host vehicle, determine probabilities of a plurality of potential behaviors of the second vehicle based on the received dynamic traffic flow feature information, predict a future path of the second vehicle, and use the predicted future path of the second vehicle in a vehicle control function. In some embodiments, the vehicle processor of the first vehicle may predict a behavior of a third vehicle based on received intention information about the second vehicle, and may adjust a behavior of the first vehicle based on the predicted behavior of the third vehicle.

27 Claims, 10 Drawing Sheets

(51) Int. Cl.
*B60W 40/04* (2006.01)
*H04W 4/40* (2018.01)

(52) U.S. Cl.
CPC ..... *B60W 2556/10* (2020.02); *B60W 2556/45* (2020.02)

(58) Field of Classification Search
CPC ............. B60W 40/04; B60W 2556/10; B60W 2556/45; H04W 4/40
See application file for complete search history.

(56) References Cited

U.S. PATENT DOCUMENTS

| | | |
|---|---|---|
| 11,521,396 B1 | 12/2022 | Jain et al. |
| 2014/0236414 A1 | 8/2014 | Droz et al. |
| 2018/0120859 A1 | 5/2018 | Eagelberg et al. |
| 2018/0122244 A1 | 5/2018 | Mueller |
| 2020/0064851 A1 | 2/2020 | Wilkinson |
| 2020/0098269 A1 | 3/2020 | Wray et al. |
| 2020/0290651 A1 | 9/2020 | Pan et al. |
| 2020/0339124 A1 | 10/2020 | Vassilovski et al. |
| 2020/0353917 A1 | 11/2020 | Leitermann et al. |
| 2020/0391738 A1 | 12/2020 | Isele |
| 2021/0024069 A1* | 1/2021 | Herman .......... B60W 60/00274 |
| 2021/0122380 A1 | 4/2021 | Lan et al. |
| 2021/0221405 A1 | 7/2021 | Zhu et al. |
| 2021/0237769 A1 | 8/2021 | Ostafew |
| 2021/0253136 A1 | 8/2021 | Yoshihara et al. |
| 2021/0300412 A1* | 9/2021 | Dingli ............... B60W 50/0098 |
| 2022/0028274 A1 | 1/2022 | Fang et al. |
| 2023/0028980 A1* | 1/2023 | Li ..................... B60W 30/0953 |
| 2023/0073966 A1* | 3/2023 | Caveney .......... B60W 50/0097 |
| 2023/0159025 A1 | 5/2023 | Tummala et al. |

* cited by examiner

Example protocol stack and related core standards for C-ITS in Europe

MANAGING VEHICLE BEHAVIOR BASED ON PREDICTED BEHAVIOR OF OTHER VEHICLES

BACKGROUND

Standards and protocols are under development for an Intelligent Transportation System (ITS) supported by next-generation 5G NR communication systems. Appropriately configured devices of vehicles and pedestrians can participate in the ITS by sending and receiving Vehicle-to-Everything (V2X) messages, such as Basic Safety Messages (BSMs), that include information about the ITS participant's current and/or upcoming behavior, enabling other ITS participants to operate more safely. However, while an autonomous vehicle may receive information, perform path planning, and make maneuvering decisions very quickly, the autonomous vehicle may be limited to reacting to information perceived from the environment and/or information received from other vehicles, (e.g., BSMs).

SUMMARY

Various aspects include methods for managing vehicle behavior performed by a vehicle processing system, such as a vehicle-to-everything (V2X) processing device. Various aspects may include receiving, by a first vehicle (also referred to as a host vehicle), dynamic traffic flow feature information relevant to movements of a second vehicle within a predetermined proximity to the first vehicle, determining probabilities of a plurality of potential behaviors of the second vehicle based on the received dynamic traffic flow feature information, wherein each of the plurality of potential behaviors take into account the received dynamic traffic flow feature information, predicting a future path of the second vehicle based on the determined probabilities of the plurality of potential behaviors of the second vehicle, and using the predicted future path of the second vehicle in a vehicle control function.

Some aspects may include receiving additional vehicle dynamic traffic flow feature information that indicates movements of a third vehicle within the predetermined proximity to the first vehicle. In such aspects, determining probabilities of the plurality of potential behaviors of the second vehicle based on the received dynamic traffic flow feature information may include determining the probabilities of the plurality of potential behaviors of the second vehicle taking into account the additional vehicle dynamic traffic flow feature information. In some aspects, using the predicted future path of the second vehicle in the vehicle control function includes adjusting a behavior of the first vehicle.

Some aspects may include receiving, from a vehicle-to-everything (V2X) resource remote from the first vehicle, probabilities of potential behaviors of a third vehicle. In such aspects, determining probabilities of a plurality of potential behaviors of the second vehicle based on the received dynamic traffic flow feature information may include determining the probabilities of the plurality of potential behaviors of the second vehicle taking into account the received probabilities of the potential behavior of the third vehicle. In some aspects, the plurality of potential behaviors of the second vehicle may include more than one path option available to the second vehicle.

Some aspects may include receiving historical information regarding vehicle behaviors in the area traveled by the first vehicle. In such aspects, determining probabilities of the plurality of potential behaviors of the second vehicle may include determining the probabilities of the plurality of potential behaviors of the second vehicle based on the received historical information. In some aspects, receiving dynamic traffic flow feature information further may include receiving, from a database, probabilities for each of a plurality of path options available to the second vehicle, and receiving, from sensors, observation information related to movements of the second vehicle. In some aspects, the received dynamic traffic flow feature information may be received via vehicle-to-everything (V2X) communications.

In some aspects, determining probabilities of a plurality of potential behaviors of the second vehicle based on the received dynamic traffic flow feature information may include determining the probabilities of the plurality of potential behaviors of the second vehicle based on updated map feature information included in the received dynamic traffic flow feature information. In some aspects, determining probabilities of a plurality of potential behaviors of the second vehicle based on the received dynamic traffic flow feature information may include determining the probabilities of the plurality of potential behaviors of the second vehicle using at least one of regression or classification models for predicted movements of vehicles surrounding the first vehicle.

Further aspects include a vehicle processing system including a memory and a processor configured to perform operations of any of the methods summarized above. Further aspects may include a vehicle processing system having various means for performing functions corresponding to any of the methods summarized above. Further aspects may include a non-transitory processor-readable storage medium having stored thereon processor-executable instructions configured to cause a processor of a vehicle processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
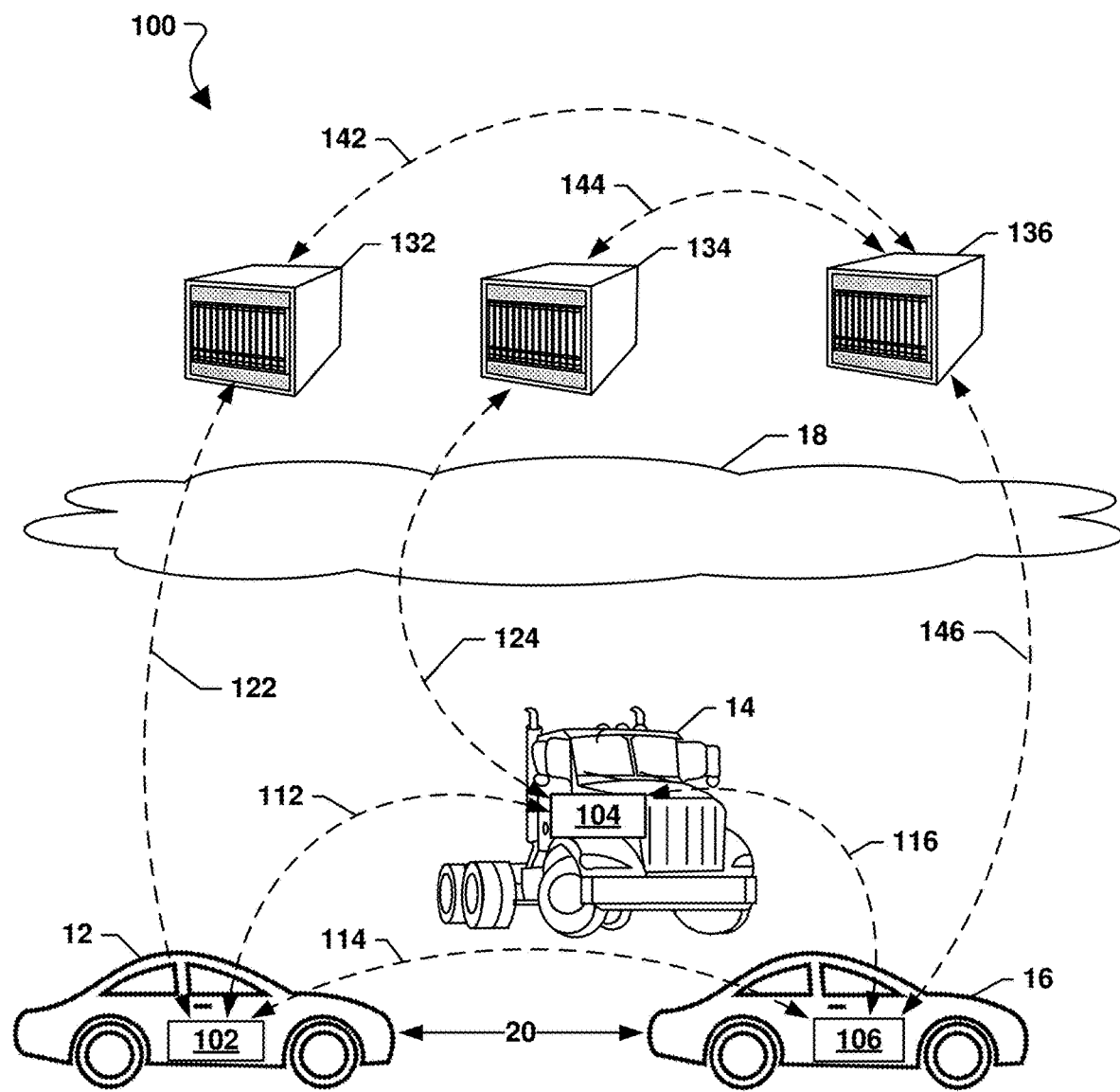
FIG. 1A is a system block diagram illustrating an example V2X system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and mechanisms for managing vehicle behavior based on dynamic traffic flow features and traffic flows due to behaviors of other vehicles. Various embodiments enable a vehicle processor (e.g., a V2X processor, processing device, or processing system) to predict future behavior of other vehicles, and to perform a vehicle control function, or adjust a behavior of the vehicle, based on the predicted behavior of the other vehicles. In various embodiments, the vehicle processor of a host vehicle (referred to as a first vehicle in the claims and some descriptions herein) may receive dynamic traffic flow feature information relevant to movements of a second vehicle within a predetermined proximity to the host vehicle. The vehicle processor may determine probabilities of a plurality of potential behaviors of the second vehicle based on the received dynamic traffic flow feature information, in which each of the plurality of potential behaviors take into account the received dynamic traffic flow feature information. Based on the determined probabilities of the plurality of potential behaviors of the second vehicle, the vehicle processor may predict a future path of the second vehicle, and may use the predicted future path of the second vehicle in a vehicle control function. In various embodiments, the vehicle processor of the host vehicle may receive intention information of a second vehicle indicating an intended behavior of the second vehicle. Based on the received intention information of the second vehicle, the vehicle processor may predict a behavior of a third vehicle. The vehicle processor may adjust a behavior of the host vehicle based on the predicted behavior of the third vehicle.

As used herein, "vehicle" refers generally to a sender and/or receiver of V2X messages in an ITS, for example, a car, truck, bus, train, boat, pedestrian, bicycle, motorcycle, scooter, any other type of ITS station, or any other suitable ITS participant type.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various examples.

Standards are under development in multiple regions of the world for vehicle-based communication systems and functionality, such as the standards being developed by the Institute of Electrical and Electronics Engineers (IEEE) and Society of Automotive Engineers (SAE) for use in North America, or in the European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), etc. The processing of such messages in the transmitting and receiving vehicles may be performed by a processor or processing system of onboard equipment that provides the vehicle-to-everything (V2X) functionality (referred to herein as a "vehicle processor").

V2X systems and technologies hold great promise for improving traffic flows and vehicle safety by enabling vehicles to share information regarding their location, speed, direction of travel, braking, and other factors that may be useful to other vehicles for anti-collision and other safety functions. An element of V2X systems is the ability for a vehicle to broadcast V2X information in a V2X message, such as a Basic Safety Messages (BSM) or a Cooperative Awareness Messages (CAM), which other vehicles can receive and process to improve traffic safety. A vehicle may transmit a V2X message frequently, in some implementations up to 20 times per second. With most or all vehicles transmitting V2X information, receiving vehicles may receive information from other vehicles to control their own speed, direction, maneuvering, path planning, etc. to avoid collisions and efficiently and safely position vehicles with respect to each other. Further, V2X equipped vehicles may improve traffic flow by safely reducing separation distances, platooning several vehicles together, and avoiding vehicles experiencing breakdowns.

While an autonomous vehicle may receive information, perform path planning, and make maneuvering decisions very quickly, the autonomous vehicle may be limited to reacting to information perceived from the environment and/or information received from other vehicles, (e.g., BSMs). Prediction of the behavior of other vehicles is a challenge for vehicle processors. A vehicle processor may receive information about other vehicles from sensors (e.g., cameras, radar, lidar, etc.). The vehicle processor also may receive access to a map of the environment, which in some implementations may be an information-rich map, such as a high definition (HD) map. The vehicle processor also may receive location information from a positioning system or a communication network.

A vehicle processor may be configured to use a variety of such information to predict the future behavior of other vehicles, for example, over a short time horizon (for example, seconds or minutes). Such behavior prediction may enable the vehicle processor to make safe operational decisions (such as maneuvering, path planning, and subsystem selection), and utilize computational resources more efficiently. However, conventional approaches are limited to making predictions over a short time horizon, and to using information received from or perceived about other vehicles. In some implementations, the short time horizon prediction problem may be addressed as a regression problem, in which the vehicle processor estimates positions of one or more neighboring vehicles and their states and interactions for next few seconds, or as a classification problem, in which the vehicle processor estimates a behavioral intention of one or more other vehicles, such as whether a vehicle is planning for a left-lane-change, a right-lane-change, accelerating, decelerating, etc.

Some conventional approaches may predict other vehicle behavior over a short time horizon by designing a rasterized view of the environment and applying a trained neural network. Many classification behavior prediction techniques employ perceived features (e.g., received by a vehicle sensor) such as lateral distance, distance from boundary, blinker observation from perception, lateral velocity, positions of other vehicles, map cues such as curvature of the road, existence of lane information (to the left or right) etc. As noted above, a vehicle typically may make such observations (e.g., via one or more sensors) over a short time-horizon (e.g., in five-second observation windows). However, conventional approaches typically do not utilize long-term temporal cues presented by traffic flow or determinable from the environment, such as upcoming road teachers, structure, disposition, and/or other conditions). Considering the safety-critical nature of autonomous vehicle behavior, early predictions of other vehicle behavior with a low computational overhead may improve driving decisions made by vehicle processors, improve an overall quality of driving, and help to prevent catastrophic incidents.

Various embodiments include methods and mechanisms for managing vehicle behavior. Various embodiments enable a vehicle processor (e.g., a V2X processor, processing device, or processing system) to predict future behavior of other vehicles, and to perform a vehicle control function, or adjust a behavior of the vehicle, based on the predicted behavior of the other vehicles.

Various embodiments may use behavior prediction of other vehicles to control a host vehicle. The behavior prediction may include a predicted future path of other vehicles within a predetermined proximity to the host vehicle (also referred to as the first vehicle), such as a lane change, lane keep, acceleration, deceleration, a combination thereof, or the like. The human decision-making process generally determines future possibilities and outcomes based on known and/or observable information. In the context of autonomous vehicular (AV) systems, analogous determinations regarding future possibilities and outcomes may enable an AV system to predict future states of the other vehicles, which is needed for path planning, collision avoidance and overall vehicle safety. Using a combination of perception inputs, positioning inputs, and map data may enable behavior prediction of other vehicles by an AV system. Such behavior predictions may enable AV systems to plan ahead, distribute computational resources, and/or switch between different subsystems to effectively predict the behavior of other vehicles and determine vehicle maneuvers and path planning accordingly.

Various embodiments include methods performed by a processor of a host vehicle for predicting future paths of other vehicles based on dynamic traffic flow feature information relevant to movements of other vehicles (e.g., a second vehicle, a third vehicle, etc.) within a predetermined proximity to the host vehicle. Based on the received dynamic traffic flow feature information the vehicle processor may determine probabilities of a plurality of potential behaviors of the other vehicles. In determining each of the plurality of potential behaviors, the vehicle processor may take into account the received dynamic traffic flow feature information. Based on the determined probabilities of the plurality of potential behaviors of the second vehicle, the vehicle processor may predict a future path of the second vehicle and use the predicted future path of the second vehicle in a vehicle control function, such as generating commands to perform or modify a vehicle maneuver, perform or update path planning, adjust a behavior of the host vehicle and the like.

Some embodiments may include the vehicle processor receiving additional vehicle dynamic traffic flow feature information that indicates movements of a third vehicle within the predetermined proximity to the host vehicle. The vehicle processor may determine the probabilities of the plurality of potential behaviors of the second vehicle by taking into account the additional vehicle dynamic traffic flow feature information.

Some embodiments may include the vehicle processor receiving probabilities of potential behaviors of a third vehicle from a vehicle-to-everything (V2X) resource remote from the host vehicle, and determining the probabilities of the plurality of potential behaviors of the second vehicle taking into account the received probabilities of the potential behavior of the third vehicle. In some embodiments, the plurality of potential behaviors of the second vehicle may include more than one path option available to the second vehicle.

Some embodiments may include the vehicle processor receiving historical information regarding vehicle behaviors in the area traveled by the host vehicle, and determining the probabilities of the plurality of potential behaviors of the second vehicle based on the received historical information.

Some embodiments may further include the vehicle processor receiving or obtaining from a database probabilities for each of a plurality of path options available to the second vehicle and receiving from sensors observation information related to movements of the second vehicle, such as via vehicle-to-everything (V2X) communications, and determining the probabilities of the plurality of potential behaviors of the second vehicle based on updated map feature information included in the received dynamic traffic flow feature information. In some embodiments, the vehicle processor may determine the probabilities of the plurality of potential behaviors of the second vehicle using at least one of regression or classification models for predicted movements of vehicles surrounding the host vehicle.

Various embodiments include methods performed by a vehicle processor of a host vehicle (also referred to as a first vehicle) for managing host vehicle behavior. In various embodiments, a vehicle processor of a host vehicle may receive intention information of a second vehicle indicating an intended behavior of the second vehicle. Based on the received intention information of the second vehicle, the host vehicle processor may predict a behavior of a third vehicle. Based on the predicted behavior of the third vehicle, the host vehicle processor may adjust a behavior of the host (i.e., first) vehicle.

In some embodiments, the vehicle processor may use information received (e.g., from another vehicle) or perceived (e.g., via a sensor) to perform such predictions. In some embodiments, the vehicle processor may determine a "social context" to facilitate predictions of vehicle behavior. The vehicle processor may construct a rich informational context including information received (e.g., from another vehicle) or perceived (e.g., via sensors), HD map information, environmental information observed while driving, and/or the like. The vehicle processor also may incorporate information about changes in traffic conditions or traffic flow, such as average lane speed(s), lane changes, braking behaviors, acceleration behaviors, exiting traffic, entering traffic, and/or the like. The vehicle processor also may incorporate information about changes in the driving environment, such as lane closures, accidents, the presence of an emergency vehicle, and so forth, that may affect the behavior of other vehicles and or the flow of traffic (e.g., from a closed lane to an open lane). In some embodiments, the vehicle processor may scale up lane change probabilities, or sample from lane change trajectory distributions.

In some embodiments, the vehicle processor may apply one or more prediction or planning algorithms to predict the behavior of the third vehicle. In some embodiments, the vehicle processor may perform different prediction computations based on a priority assigned to the second vehicle or the third vehicle, and/or map information. For example, vehicles within a distance threshold from the host vehicle, such as vehicles directly in front of, behind, or to the side of the host vehicle, may be assigned a relatively high priority, and vehicles more distant from the host vehicle (e.g., beyond the distance threshold) may be assigned a lower priority. In some embodiments, for vehicles assigned the relatively high priority, the vehicle processor may apply a prediction algorithm to predict the behavior such vehicles. In some embodiments, for vehicle's assigned the lower priority, the vehicle processor of the host vehicle may query another vehicle, a roadside unit, and/or another network element for prediction information regarding such vehicles. In some embodiments, prediction algorithms or planning algorithms may be distributed among vehicles and or network elements such as roadside units. For example, even if different vehicles and/or network elements may employ different prediction algorithms, computing infrastructure, etc., common processes or procedures, such as map feature extraction, may be distributed among different vehicles, network elements, and/or the like.

In some embodiments, the vehicle processor of the host vehicle may receive V2X information from the second vehicle that includes the intention information of the second vehicle. In some embodiments, the vehicle processor of the host vehicle may receive dynamic traffic flow feature information relevant to the second vehicle and predict the behavior of the third vehicle based on the dynamic traffic flow feature information relevant to the second vehicle.

In some embodiments, the vehicle processor may generate vehicle motion commands to cause the vehicle to perform a maneuver based on the predicted behavior of the third vehicle. In some embodiments, the vehicle processor may generate vehicle motion commands to change an ongoing maneuver based on the predicted behavior of the third vehicle. In some embodiments, the vehicle processor may adjust a planned path of travel based on the predicted behavior of the third vehicle.

For ease of reference, some embodiments are described in this application with reference to a host vehicle (also referred to as a first vehicle herein) using a particular V2X system, device, and/or and protocol. However, it should be understood that various embodiments encompass any or all of the V2X or vehicle-based communication standards, devices, messages, protocols, and/or technologies. As such, descriptions of various embodiments should be construed to limit the claims to a particular system (e.g., V2X) or message or messaging protocol (e.g., BSM or CAM) unless expressly recited as such in the claims. In addition, the embodiments described herein may refer to a V2X processing system in a vehicle. Other embodiments are contemplated in which the V2X processing system may operate in or be included in mobile devices, mobile computers, roadside units (RSUs), and other devices that are equipped to monitor road and vehicle conditions and to participate in V2X communications.

Figure 1B:
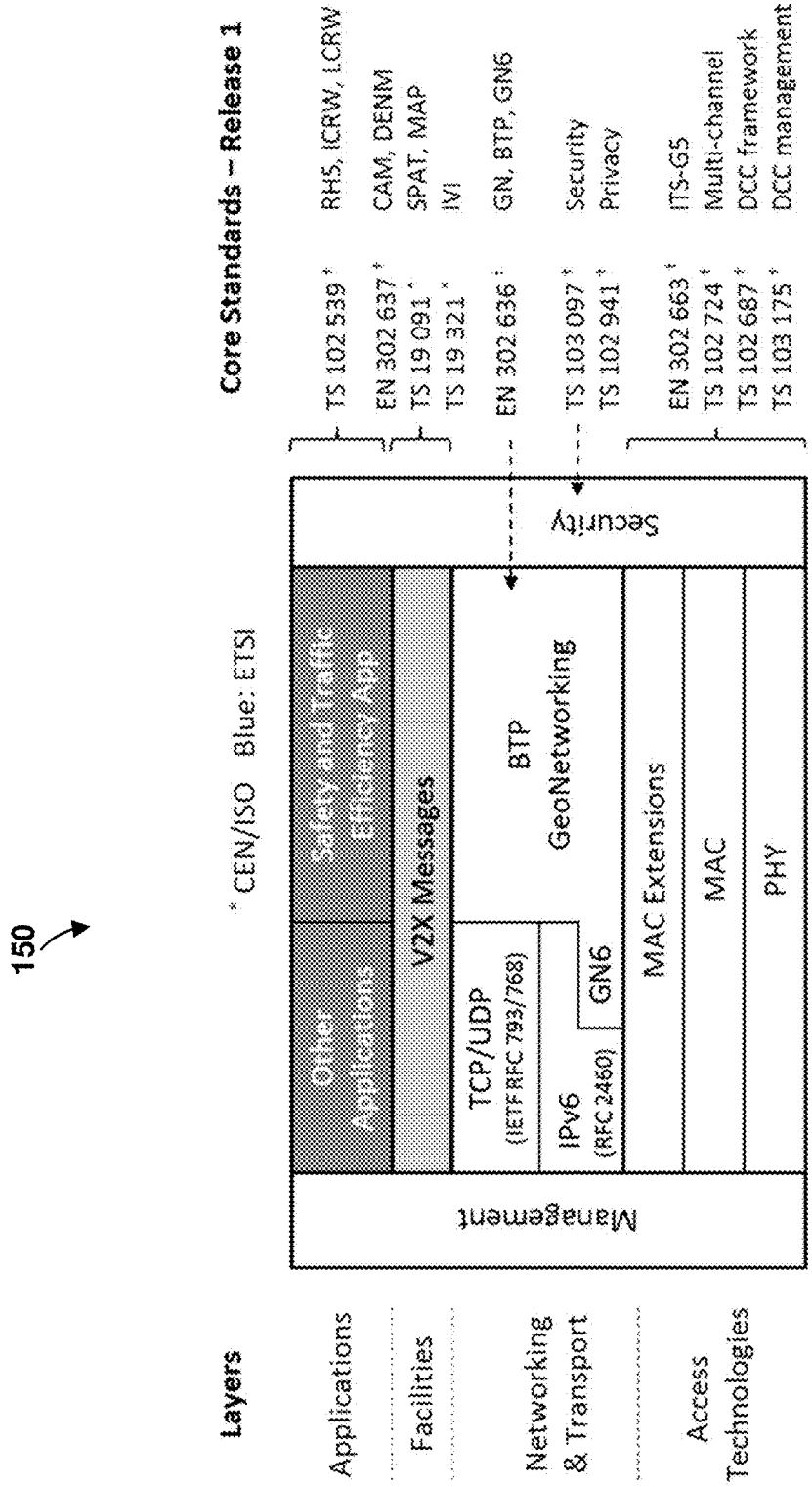
FIG. 1B is a conceptual diagram illustrating an example V2X communication protocol stack suitable for implementing various embodiments.

FIG. 1A is a system block diagram illustrating an example V2X system 100 suitable for implementing various embodiments. FIG. 1B is a conceptual diagram illustrating an example V2X communication protocol stack 150 suitable for implementing various embodiments. With reference to FIGS. 1A and 1B, a vehicle 12, 14, 16 may include vehicle processor 102, 104, 106, respectively (e.g., a V2X processing device, such as in V2X onboard equipment), that may be configured to periodically broadcast V2X messages (e.g., BSM, CAM) 112, 114, 116 for receipt and processing by other vehicles' processing systems (e.g., 102, 104, 106).

By sharing the vehicle location, speed, direction, behavior (e.g., braking), and other information, vehicles can maintain safe separation and identify and avoid potential collisions. For example, a trailing vehicle 12 receiving V2X messages 114 from a leading vehicle 16 can determine the speed and location of the vehicle 16, enabling the trailer vehicle 12 to match the leading vehicle's speed and maintain a safe separation distance 20. By being informed through V2X messages 114 when the leading vehicles 16 applies the brakes, the vehicle processor 102 in the trailing vehicle 12 can apply brakes simultaneously to maintain the safe separation distance 20 even when the leading vehicle 16 stops suddenly. As another example, the vehicle processor 104 within the truck vehicle 14 may receive V2X messages 112, 116 from the two vehicles 12, 16, and thus be informed that the truck vehicle 14 should stop at an intersection to avoid a collision. Further, each of the vehicle processors 102, 104, 106 may communicate with one another using any of a variety close proximity communication protocols.

In addition, the vehicles 12, 14, 16 may be able to transmit data and information regarding V2X messages to a variety of network elements 132, 134, 136 via communication links 122, 124, 146 through a communication network 18 (e.g., V2X, cellular, Wi-Fi, etc.) For example, a network element 132 may be incorporated into, or may be in communication with, an RSU, a gantry unit, and/or the like. The network element 134, 136 may be configured to perform a function or service related to a vehicle 12, 14, 16, such as payment processing, road condition monitoring, emergency provider message handling, and the like. The network element 134, 136 may be configured to communicate with one another through wired or wireless networks 142, 144 to exchanging information associated with payment processing, road condition monitoring, emergency provider message handling, and similar services.

Figure 2:
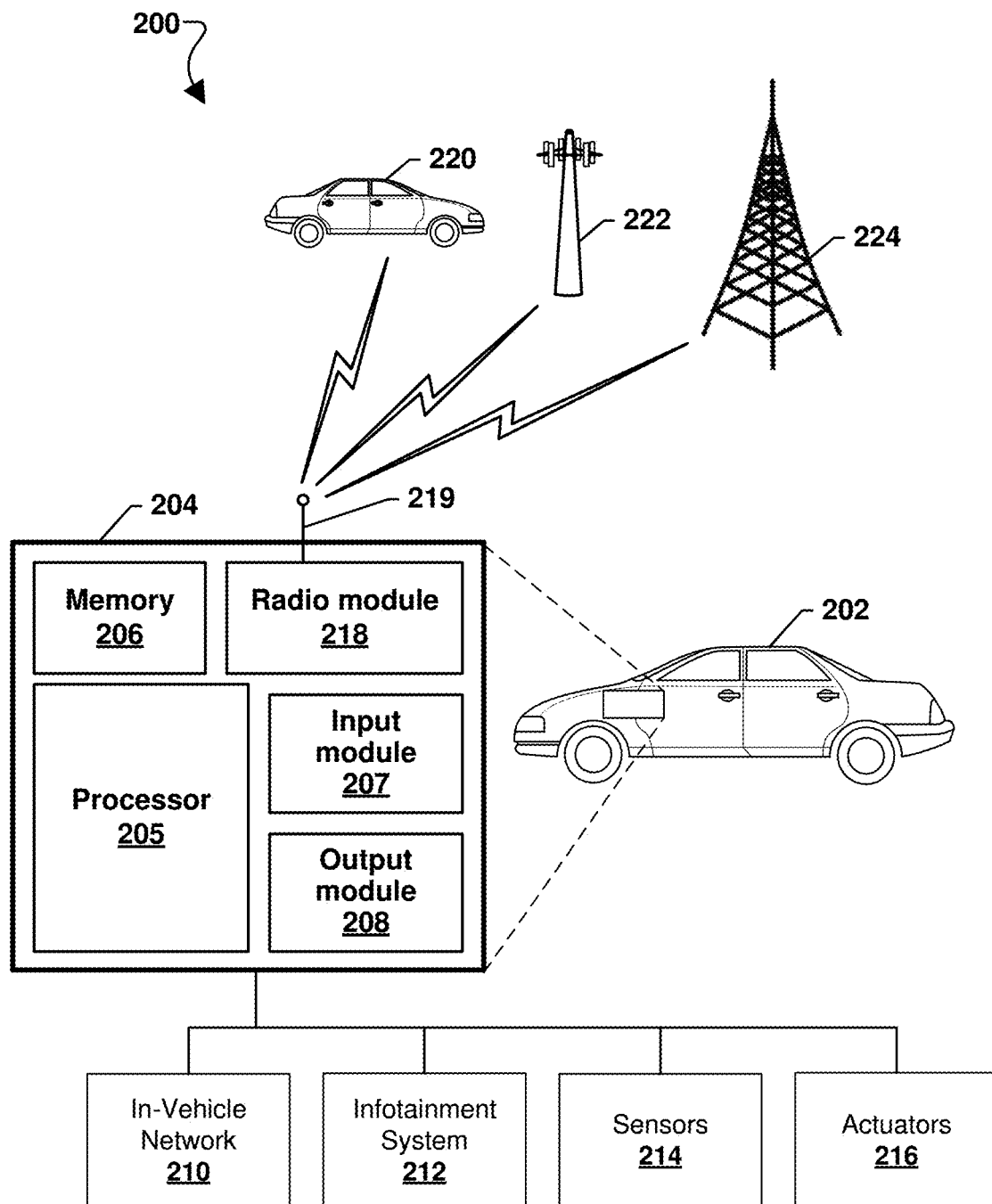
FIG. 2 is a component diagram of an example vehicle system suitable for implementing various embodiments.

FIG. 2 is a component diagram of an example vehicle system 200 suitable for implementing various embodiments. With reference to FIGS. 1A-2, the system 200 may include a first vehicle 202 (e.g., a host vehicle) that includes a vehicle processing system 204, for example, a V2X processing device, such as a telematics control unit or on-board unit (TCU/OBU). The vehicle processing system 202 may communicate with various systems and devices, such as an in-vehicle network 210, an infotainment system 212, various sensors 214, various actuators 216, and a radio module 218. The vehicle processing system 202 also may communicate with various one or more other vehicles 220, roadside units 222, base stations 224, and other external devices. The vehicle processing system 204 may be configured to perform operations for misbehavior detection as further described below. The first vehicle 202 and the one or more other vehicles 220 may include the elements of and operate like the vehicles (e.g., 12, 14, 16) described with regard to FIG. 1A.

The vehicle processing system 204 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 204 may include a V2X antenna 219 coupled to the radio module 218 that is configured to communicate with one or more ITS participants (e.g., stations) such as one or more other vehicles 220, a roadside unit 222, and a base station 224 or another suitable network access point. The V2X antenna 219 and radio module 218 may be configured to receive dynamic traffic flow feature information via vehicle-to-everything (V2X) communications. In various embodiments, the vehicle processing system 204 may receive information from a plurality of information sources, such as the in-vehicle network 210, infotainment system 212, various sensors 214, various actuators 216, and the radio module 218. The vehicle processing system 204 may be configured to detect misbehavior in a V2X message from an ITS participant (e.g., another vehicle), as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 3:
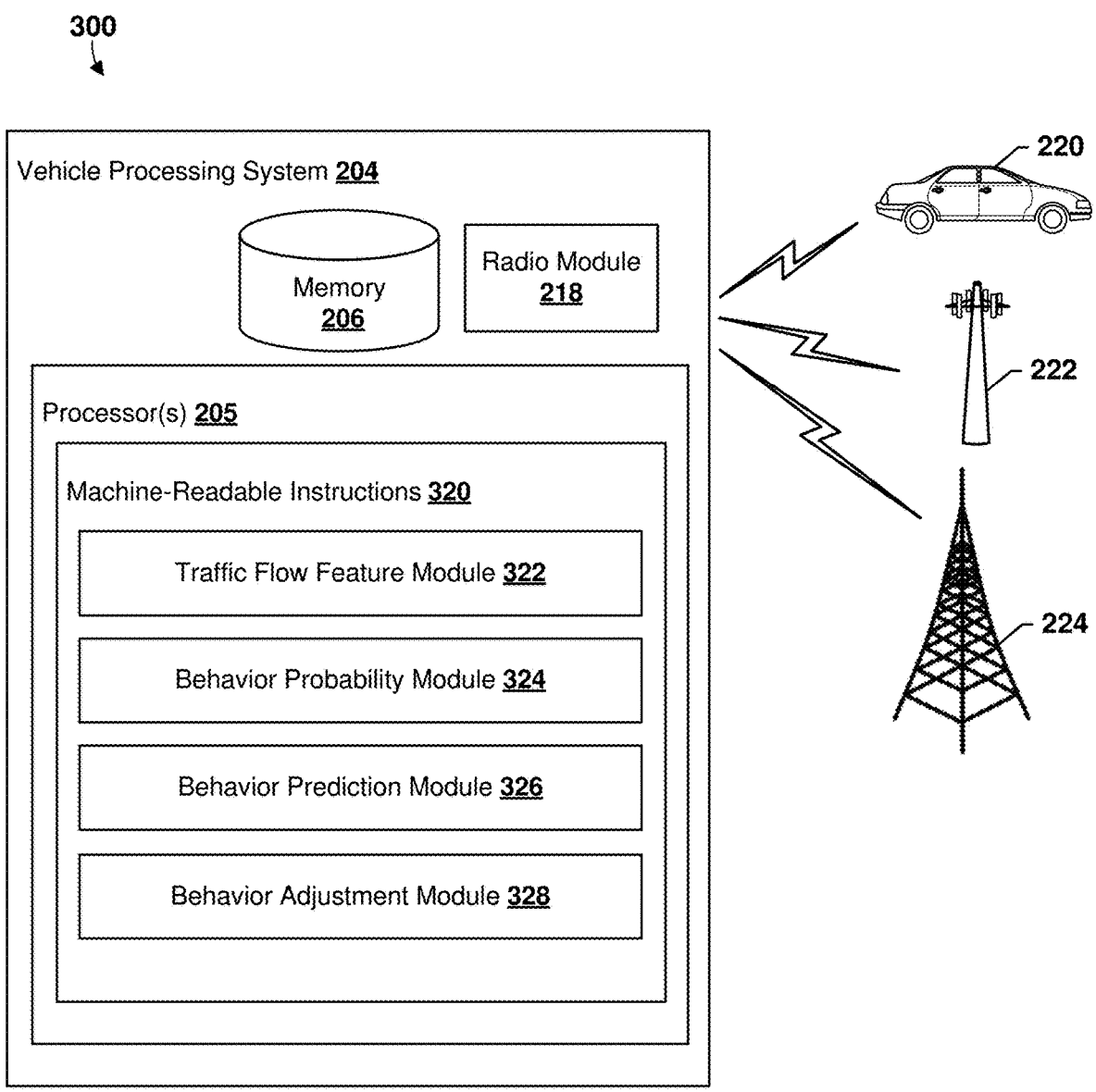
FIG. 3 is a component block diagram illustrating a system configured to perform operations for managing vehicle behavior in accordance with various embodiments

FIG. 3 is a component block diagram illustrating a system 300 configured to perform operations for managing vehicle behavior in accordance with various embodiments. With reference to FIGS. 1A-3, the system 300 may include a vehicle processing system 204 of a host vehicle (e.g., vehicle 202 FIG. 2), one or more other vehicles 220, a roadside unit 222, and/or a base station 224.

The vehicle processing system 204 may include one or more processors 205, memory 206, a radio module 218), and other components. The vehicle processing system 204 may include a plurality of hardware, software, and/or firmware components operating together to provide the functionality attributed herein to the processor 205.

The memory 206 may include non-transitory storage media that electronically stores information. The electronic storage media of memory 206 may include one or both of system storage that is provided integrally (i.e., substantially non-removable) with the vehicle processing system 204 and/or removable storage that is removably connectable to the vehicle processing system 204 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The memory 206 may include one or more virtual storage resources (e.g., cloud storage, a virtual private network, and/or other virtual storage resources). Memory 206 may store software algorithms, information determined by processor(s) 205, information received from the one or more other vehicles 220, information received from the roadside unit 222, information received from the base station 224, and/or other information that enables the vehicle processing system 204 to function as described herein.

The processor(s) 205 may include one of more local processors that may be configured to provide information processing capabilities in the vehicle processing system 204. As such, the processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3 as a single entity, this is for illustrative purposes only. In some embodiments, the processor(s) 205 may include a plurality of processing units. These processing units may be physically located within the same device, or the processor(s) 205 may represent processing functionality of a plurality of devices operating in coordination.

The vehicle processing system 204 may be configured by machine-readable instructions 320, which may include one or more instruction modules. The instruction modules may include computer program modules. In various embodiments, the instruction modules may include one or more of a traffic flow feature module 322, a behavior probability module 324, a behavior prediction module 326, a behavior adjustment module 328, and/or other modules.

The traffic flow feature module 322 may be configured to receive dynamic traffic flow feature information relevant to movements of a second vehicle within a predetermined proximity to the host vehicle. The dynamic traffic flow feature information relevant to movements of the second vehicle received by the traffic flow feature module 322 may include a closest and/or other distance to the host vehicle, a distance of the second vehicle from lane center (Dlat), a differential of Dlat (Vlat), acceleration/deceleration, speed, direction of travel, etc. In addition, the predetermined proximity to the host vehicle may be a range within a preset distance from the host vehicle in close proximity thereto. For example, the predetermined distance may be within a range of the dedicated short range communications used to exchange BSMs (e.g., ~1000 m). Alternatively, a shorter or longer distance may be used by the traffic flow feature module 322 as the predetermined distance.

The traffic flow feature module 322 may be configured to receive additional vehicle dynamic traffic flow feature information that indicates movements of one or more other vehicles (e.g., a third vehicle) within the predetermined proximity to the host vehicle. The additional vehicle dynamic traffic flow feature information relevant to one or more other vehicles received by the traffic flow feature module 322 may include a closest and/or other distance to the host vehicle and/or second vehicle, a distance of the other vehicle from lane center (Dlat), a differential of Dlat (Vlat), acceleration/deceleration, speed, direction of travel, etc.

The traffic flow feature module 322 may be configured to receive historical information regarding vehicle behaviors in the area traveled by the host vehicle. For example, the historical information received by the traffic flow feature module 322 may include information regarding vehicle traffic paths (e.g., lane change or lane keep), speed, acceleration/deceleration, density, proximity, etc., including particular locations on a roadway associated with the historical information. The traffic flow feature module 322 may be configured to receive probabilities for each of a plurality of path options available to the second vehicle from a database. The probabilities for each of the plurality of path options received by the traffic flow feature module 322 may reflect the extent to which something is probable; the likelihood of each path option happening or being the case.

The traffic flow feature module 322 may be configured to receive (e.g., from sensors) observation information related to movements of the second vehicle. The observation information may include the action or process of observing the second vehicle carefully or in order to gain information relevant to movements of the second vehicle. For example, observation information may include a closest and/or other distance of the second vehicle to the host vehicle, a distance of the second vehicle from lane center (Dlat), a differential of Dlat (Vlat), acceleration/deceleration, speed, direction of travel, etc.

The traffic flow feature module 322 may be configured to receive intention information (e.g., in or with V2X information) of a second vehicle indicating an intended behavior of the second vehicle.

The behavior probability module 324 may be configured to determine probabilities of a plurality of potential behaviors of the second vehicle based on the received dynamic traffic flow feature information. The behavior probability module 324 may be configured to take into account the dynamic traffic flow feature information received by the traffic flow feature module 322 in determining probabilities of the plurality of potential behaviors. The behavior probability module 324 may be configured to determine the probabilities of the plurality of potential behaviors of the second vehicle taking into account the additional vehicle dynamic traffic flow feature information. The behavior probability module 324 may be configured to receive from a V2X resource remote from the host vehicle, probabilities of potential behaviors of at least one third vehicle. The behavior probability module 324 may be configured to determine the probabilities of the plurality of potential behaviors of the second vehicle taking into account the received probabilities of the potential behavior of at least one third vehicle. The behavior probability module 324 may be configured to determine the probabilities of the plurality of potential behaviors of the second vehicle based on the received historical information. The behavior probability module 324 may be configured to determine the probabilities of the plurality of potential behaviors of the second vehicle based on updated map feature information included in the received dynamic traffic flow feature information. For example, updated map feature information may identify lane closures/blockages, obstructions, hazards, road/lane changes, etc. The behavior probability module 324 may be configured to determine the probabilities of the plurality of potential behaviors of the second vehicle using at least one of regression or classification models for predicted movements of vehicles surrounding the host vehicle.

The behavior prediction module 326 may be configured to predict a future path of the second vehicle based on the determined probabilities of the plurality of potential behaviors of the second vehicle. The behavior prediction module 326 may be configured to determine intentions of the second vehicle, such as whether the vehicle is about to execute a lane change, lane keep, turn, acceleration, deceleration, etc. and use such intentions in predicting the future path of the second vehicle. The behavior prediction module 326 may be configured to determine more than one path option available to the second vehicle.

The behavior prediction module 326 may be configured to predict the behavior of the third vehicle based on the dynamic traffic flow feature information relevant to the second vehicle.

The behavior adjustment module 328 may be configured to use the future path of the second vehicle predicted by the behavior prediction module 326 in a vehicle control function. As used herein, the expression "a vehicle control function" may include path planning and/or generating commands for execution by a vehicle control system to perform or adjust maneuvers, warn a driver in the vehicle, or a combination thereof. The behavior adjustment module 328 may be configured to generating commands for execution by a vehicle control system to perform a maneuver based on the predicted behavior of the third vehicle, such as speed up, slow down, and/or turn to avoid or reduce the chance of a collision with another vehicle. The behavior adjustment module 328 may be configured to generating commands for execution by a vehicle control system to change an ongoing maneuver based on the predicted behavior of the third vehicle. The behavior adjustment module 328 may be configured to adjust a behavior of the host vehicle, such as updating or changing a planned path of travel based on the predicted behavior of the third vehicle.

The processor(s) 205 may be configured to execute the modules 322-328 and/or other modules by software, hardware, firmware, some combination of software, hardware, and/or firmware, and/or other mechanisms for configuring processing capabilities on processor(s) 205.

The description of the functionality provided by the different modules 322-328 is for illustrative purposes, and is not intended to be limiting, as any of modules 322-328 may provide more or less functionality than is described. For example, one or more of modules 322-328 may be eliminated, and some or all of its functionality may be provided by other ones of modules 322-328. As another example, processor(s) 205 may be configured to execute one or more additional modules that may perform some or all of the functionality attributed below to one of modules 322-328.

Figure 4A:
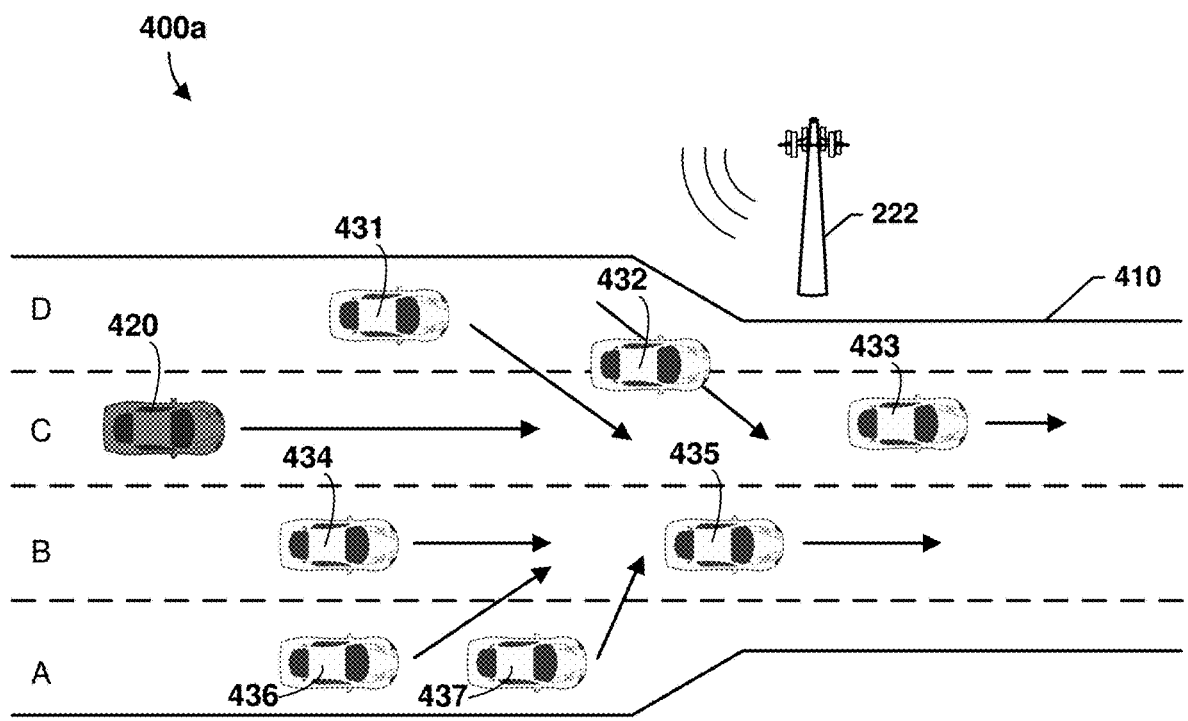
FIGS. 4A and 4B are conceptual diagrams illustrating environments in which a processor of a vehicle may use a predicted future path of one or more other vehicles for managing vehicle behavior in accordance with various embodiments.
Figure 4B:
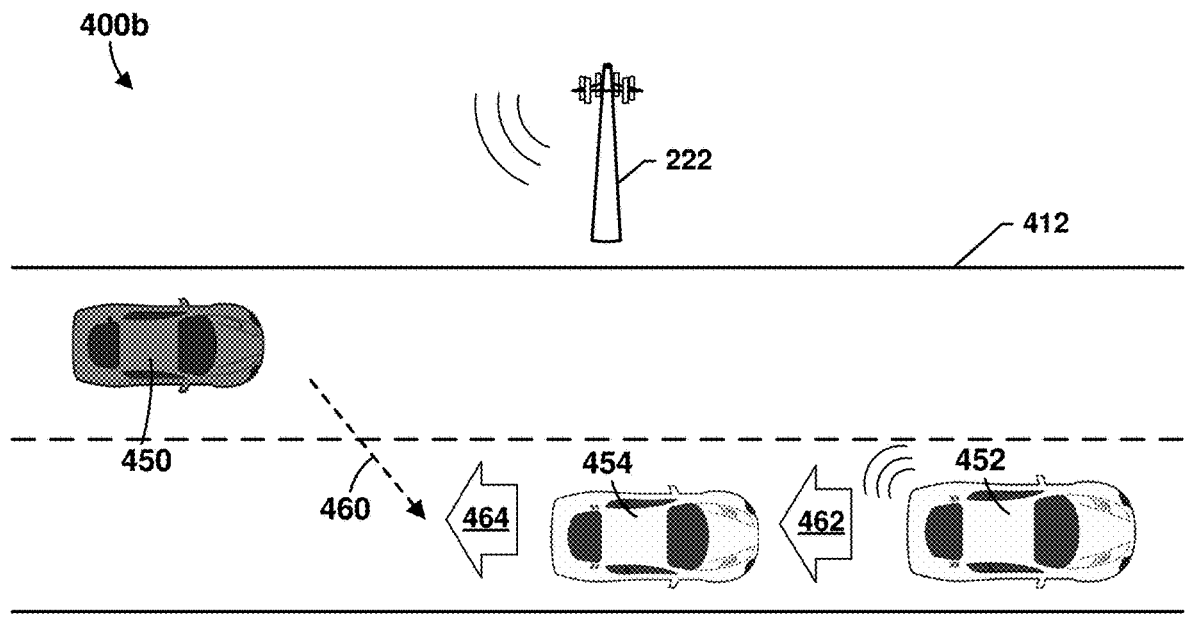
Figure 4C:
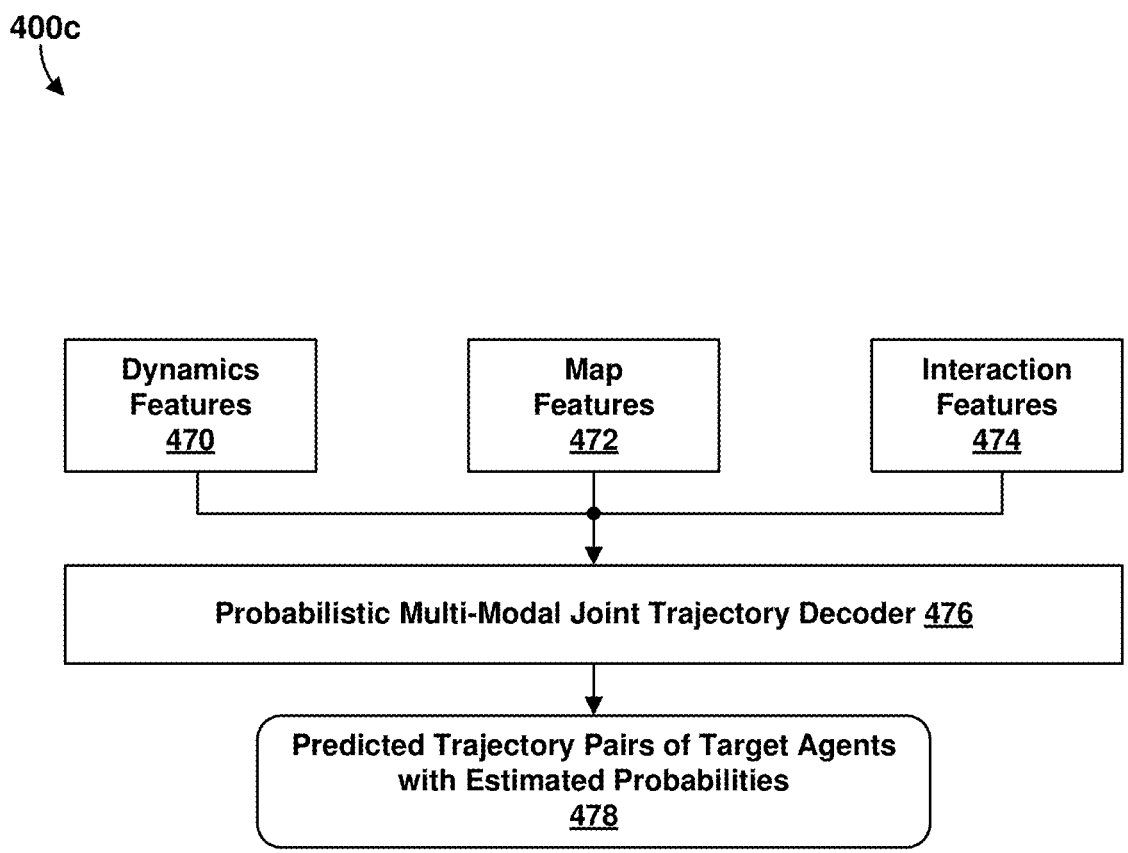
FIG. 4C is a system block diagram illustrating aspects of a prediction system suitable for implementing various embodiments.

FIGS. 4A and 4B are conceptual diagrams illustrating environments 400a and 400b in which a processor of a host vehicle may use a predicted future path of other vehicles for managing vehicle behavior in accordance with various embodiments. FIG. 4C is a system block diagram illustrating aspects of a prediction system 400c suitable for implementing various embodiments. With reference to FIGS. 1A-4C, the operations described with regard to the vehicles in the environments 400a and 400b may be performed by a vehicle processing system or vehicle processor or V2X processing device (such as the vehicle processor 102, 104, 106, 204) that may be implemented in hardware elements, software elements, or a combination of hardware and software elements (referred to collectively as a "vehicle processing system" or a "vehicle processor").

Referring to FIG. 4A, the environment 400a includes a roadway 410 with four lanes A, B, C, D that merge into the two center lanes B, C. In the example illustrated in FIG. 4A, a host vehicle 420 (i.e., a host vehicle) is operating in the third lane C, with numerous other vehicles 431-437 on the roadway 410 within relatively close proximity. The host vehicle 420 may include the elements of and/or operate like the vehicles (e.g., 12, 14, 16, 202, 220) described with regard to FIGS. 1A and 2.

In accordance with various embodiments, a processor of the host vehicle 420 may predict a future path of a second vehicle 431 traveling in the fourth lane D. In particular, the processor of the host vehicle 420 may predict the future path of the second vehicle 431 based on determined probabilities of a plurality of potential behaviors of the second vehicle 431. The determined probabilities of the plurality of potential behaviors of the second vehicle 431 may be determined based on received dynamic traffic flow feature information relevant to movements of the second vehicle 431, such as convergence of lanes as illustrated, other vehicles reacting to such flow features, etc. The processor may take into account the received dynamic traffic flow feature information in determining the plurality of potential behaviors. For example, the processor may predict the future path of the second vehicle 431 because of the proximity of the second vehicle 431 to the host vehicle 420, in particular that the second vehicle 431 is within a predetermined proximity to the host vehicle 420. In addition, the processor may predict the future path of the second vehicle 431 in response to dynamic traffic flow feature information relevant to movements of the second vehicle 431 received by the host vehicle 420. In response to the predicting the future path of the second vehicle 431 (e.g., a lane change from the fourth lane D to the third lane C), the processor of the host vehicle 420 may use the predicted future path of the second vehicle 431 in a vehicle control function. For example, the vehicle control function may direct the host vehicle 420 to slow down, maintain speed, change lanes, etc.

In some embodiments, the processor of the host vehicle 420 may receive additional vehicle dynamic traffic flow feature information that indicates movements of a third vehicle 432 within the predetermined proximity to the host vehicle 420. The movements of the third vehicle 432, which is in the fourth lane D ahead of the second vehicle 431, may affect how and/or when the second vehicle 431 behaves. For example, the additional vehicle dynamic traffic flow feature information may indicate or suggest that the third vehicle 432 will make a lane change due to the fourth lane D ending. Thus, when the processor of the host vehicle 420 determines the probabilities of the plurality of potential behaviors of the second vehicle 431, such a determination may take into account the additional vehicle dynamic traffic flow feature information that indicates movements of the third vehicle 432. In some embodiments, the processor of the host vehicle 420 may receive probabilities of potential behaviors of the third vehicle 432 from a V2X resource 222, which is remote from the host vehicle 420. In this way, the processor of the host vehicle 420 may determine probabilities of a plurality of potential behaviors of the second vehicle 431 taking into account the received probabilities of the potential behavior of the third vehicle 432.

In some embodiments, processor of the host vehicle 420 may receive historical information regarding vehicle behaviors in the area traveled by the host vehicle 420. For example, such historical information may demonstrate that vehicles traveling in the first lane A and the fourth lane D typically change lanes approximately 50 meters before the lane ends. As another example, such historical information may demonstrate that vehicles traveling in the first lane A and the fourth lane D typically slow down and/or speed up prior to the lane change. As another example, such historical information may demonstrate that vehicles traveling in the second lane B and the third lane C typically slow down as vehicles change into those lanes. In this way, the processor of the host vehicle 420 may determine probabilities of a plurality of potential behaviors of the second vehicle 431 using or based at least in part on the received historical information.

The processor of the host vehicle 420 may use extended sensing, such as receiving sensor information from other vehicles 431-437 or one or more roadside units 222, to obtain richer social context for predicting a future path of the second vehicle 431 as well as all vehicles 431-437. Such predictions by the processor may take into account changes in traffic conditions. The processor of the host vehicle 420 may consider features like average speed for a lane when determining whether a vehicle will make a lane change. This information may be estimated/computed by the processor based on predictions about other vehicles, as well as historical information. Such information may help for the processor with both path planning of a host vehicle and predicts of other vehicles. In addition, changes in the environment around a host vehicle may influence predictions made by the processor. For example, lane closures, accidents, emergency vehicle operations, etc. may be communicated to the host vehicle, which may lead to the processor predicting lane changes by other vehicles before such maneuvers are observed.

Providing a processor of a host vehicle with information that reflects the intention of one or more other vehicles may assist the processor with predicting the future path of those other vehicles. In some embodiments, such other vehicle intention information may be communicated to the host vehicle through encoded signals transmitted by other vehicles, by a roadside unit, or other intermediary device or vehicle.

Referring to FIG. 4B, the environment 400*b* includes a roadway 412 with a first vehicle 450, second vehicle 452, third vehicle 454, and one or more roadside units 222. The first vehicle 450 may include the elements of and/or operate like the vehicles (e.g., 12, 14, 16, 202, 220, 420, 431-437) described with regard to FIGS. 1A, 2, and 4A. The first vehicle 450 may plan a maneuver 460 to change lanes, for example, from a left lane to a right lane. In some embodiments, the first vehicle 450 may currently be (i.e., may be in the process of) performing the maneuver 460 to change lanes.

The first vehicle 450 may receive intention information of a second vehicle 452 indicating an intended behavior of the second vehicle. In some embodiments, the first vehicle 450 may determine the intention information of the second vehicle 452 based on perceived behavior (e.g., from information received via one or more sensors) of the second vehicle 452. In some embodiments, the first vehicle 450 may receive the intention information of the second vehicle 452 from the second vehicle 452 (e.g., via a V2X message or V2X information). In some embodiments, the first vehicle 450 may receive the intention information of the second vehicle 452 from a network element such as the road side unit (RSU) 222.

As one example, the intention information of the second vehicle 452 may indicate that the vehicle 452 intends on performing a braking maneuver 462. The braking maneuver 462 will cause the distance between the second vehicle 452 and a third vehicle 454 to decrease. In some embodiments, the vehicle processor of the first vehicle 450 may predict based on the intention information of the second vehicle 452 that the third vehicle 454 has a high probability of performing a braking maneuver 464.

The high probability braking maneuver 464 would place the third vehicle 454 into the path of the maneuver 460 planned or being performed by the first vehicle 450. In some embodiments, the vehicle processor of the first vehicle 450 may adjust a behavior of the first vehicle 450 based on the predicted behavior of the third vehicle 454. For example, the vehicle processor of the first vehicle 450 may cancel a planned performance of the maneuver 460 (i.e., cancel the lane change). As another example, the vehicle processor of the first vehicle 450 may perform a braking maneuver to slow down and maneuver behind the third vehicle 454. As another example, the vehicle processor of the first vehicle 450 may swerve to avoid a collision with the third vehicle 454. As another example, the vehicle processor of the first vehicle 450 may maneuver to return to the left lane, to avoid approaching the vehicle 454 too closely (i.e., to maintain a threshold distance), or to avoid a potential collision with the third vehicle 454.

Referring to FIG. 4C, a prediction system 400 suitable for implementing various embodiments may be implemented in a processor (e.g., 205) of a vehicle processing system or vehicle processor or V2X processing device (such as the vehicle processor 102, 104, 106, 204), which may be implemented in hardware elements, software elements, or a combination of hardware and software elements (referred to collectively as a "vehicle processor"). In various embodiments, the prediction system 400*c* may include a dynamics features module 470, a map features module 472, an interaction features module 474, and a probabilistic multi-modal joint trajectory decoder 476.

In some embodiments, the dynamics features module 470 may predict (determine, calculate, provide as an output) a dynamic behavior. In some embodiments, the predicted dynamic behavior may be based on or associated with a temporal pattern. For example, the dynamics features module 470 may provide as an output an indication that a vehicle that is detected moving from one lane to another is performing a lane change. In some embodiments, the dynamics features module 470 may be trained to provide such predictions using historical samples. In some embodiments, the dynamics features module 470 may be configured to apply (fit) historical samples (and possibly sensor data) to a trained model, or may apply the historical samples and/or sensor data to a trained neural network.

The map features module 472 may be configured to define a geometry for interaction (e.g., with the environment, with other vehicles, and the like). The map features module 472 may be configured to provide as an output an alignment of one or more predicted trajectories. For example, the map features module 472 may utilize map information, such as an upcoming road curvature, and provide as an output an alignment of a trajectory along the upcoming road curvature. In some embodiments, the map features module 472 may be configured to provide as an output map features that may affect or indicate possible trajectories (e.g., an approaching T-intersection).

The interaction features module 474 may be configured to provide as an output context information about one or more other vehicles. For example, the interaction features module 474 may information about a neighboring vehicle that may help determine (predict, calculate) whether the neighboring vehicle is likely to perform a lane change, take a road exit, etc. For example, if the neighboring vehicle is in a right-hand lane and is drifting to the right, interaction features module 474 may provide an output indicating that the neighboring vehicle is likely to change lanes to the right. The interaction features module 474 may provide an output indicating that the neighboring vehicle is not likely to perform an action or maneuver. For example, if there is an insufficient gap between vehicles to the left of the neighboring vehicle, the interaction features module 474 may provide an output indicating that the neighboring vehicle is unlikely to perform a lane change to the left.

In some embodiments, the probabilistic multi-modal joint trajectory decoder 476 may receive an output from each of the dynamics features module 470, the map features module 472, and the interaction features module 474. In some embodiments, the probabilistic multi-modal joint trajectory decoder 476 may provide as an output predicted trajectory pairs of target agents with estimated probabilities 478.

Figure 5A:
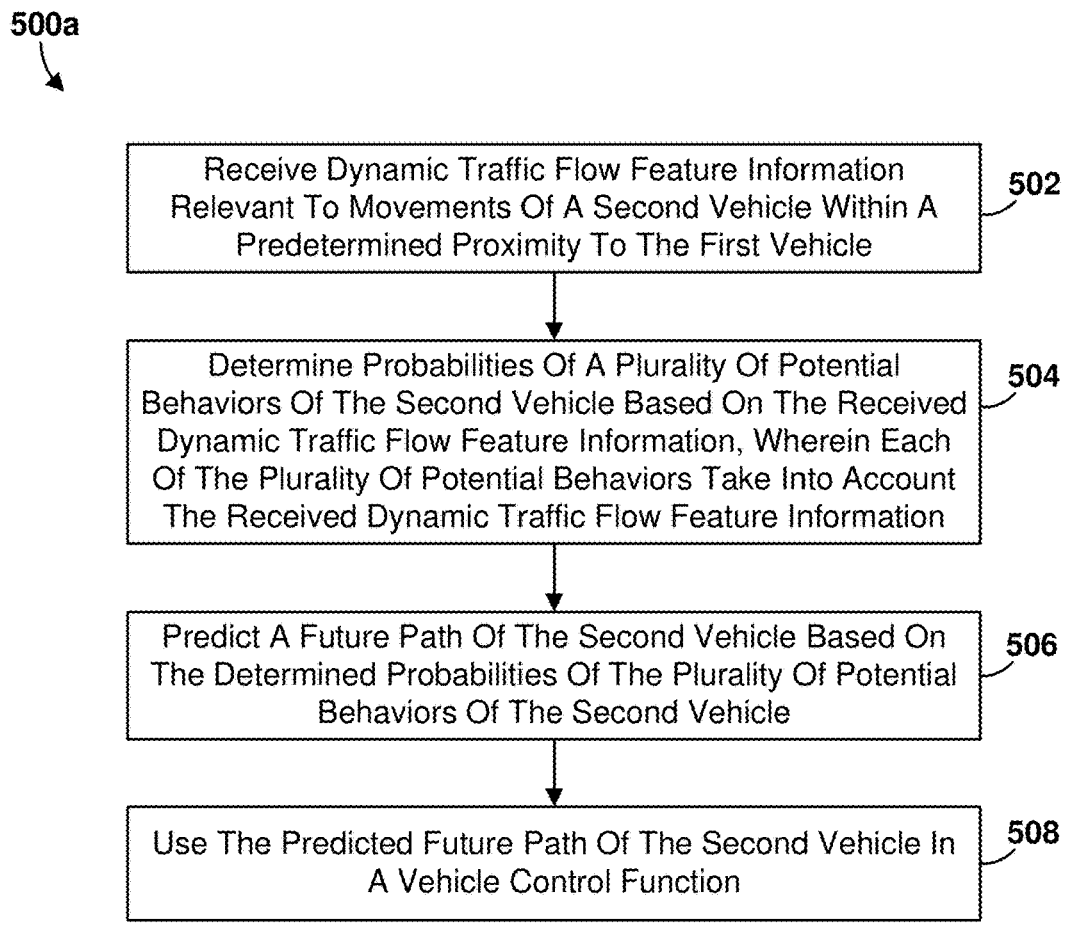
FIG. 5A is a process flow diagram of an example method 500a for managing vehicle behavior in accordance with various embodiments.
Figure 5B:
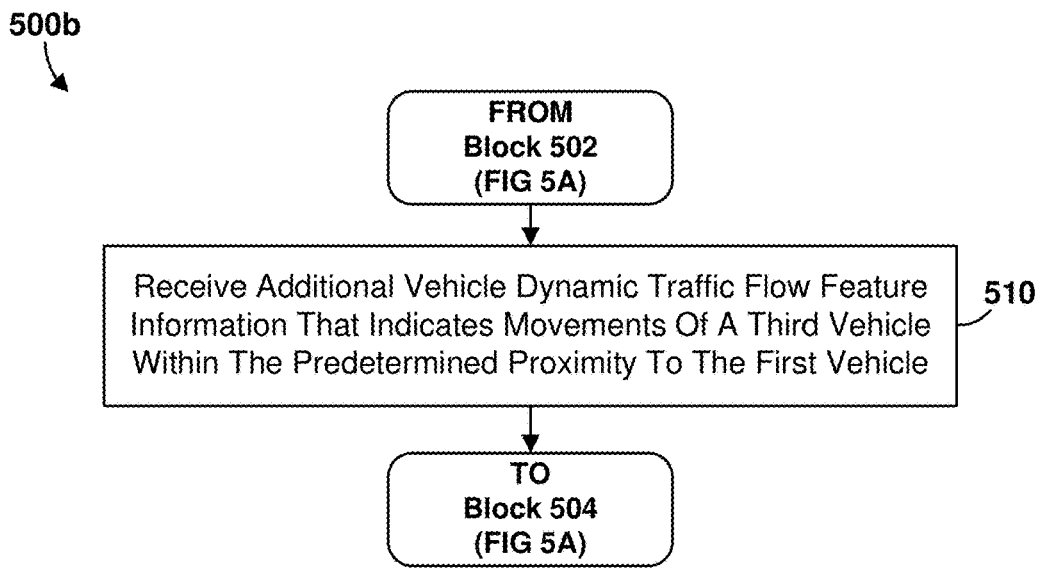
FIGS. 5B-5D are process flow diagrams of example operations 500b-500e that may be performed as part of the method 500a for managing vehicle behavior in accordance with various embodiments.
Figure 5C:
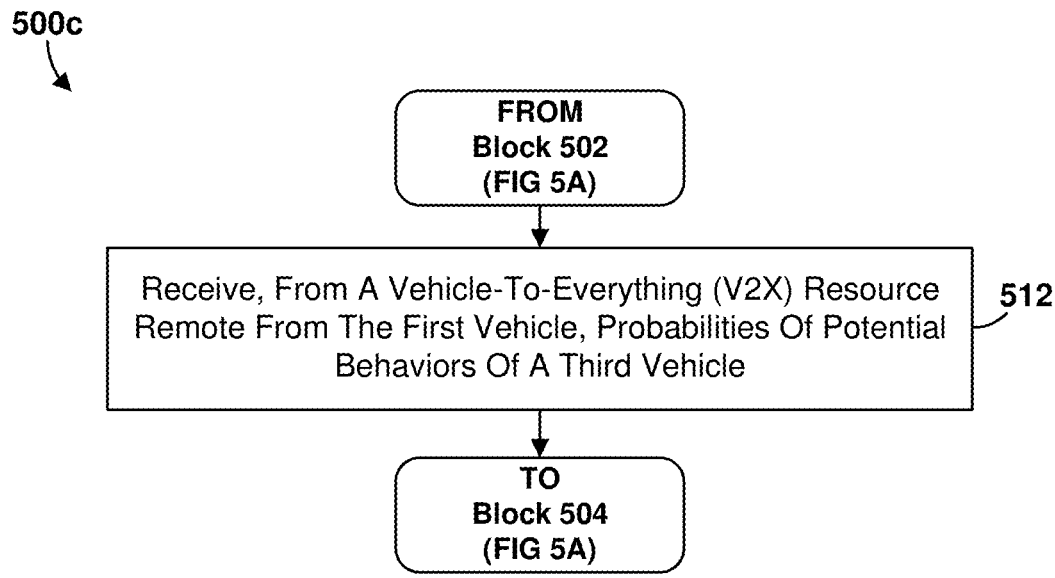
Figure 5D:
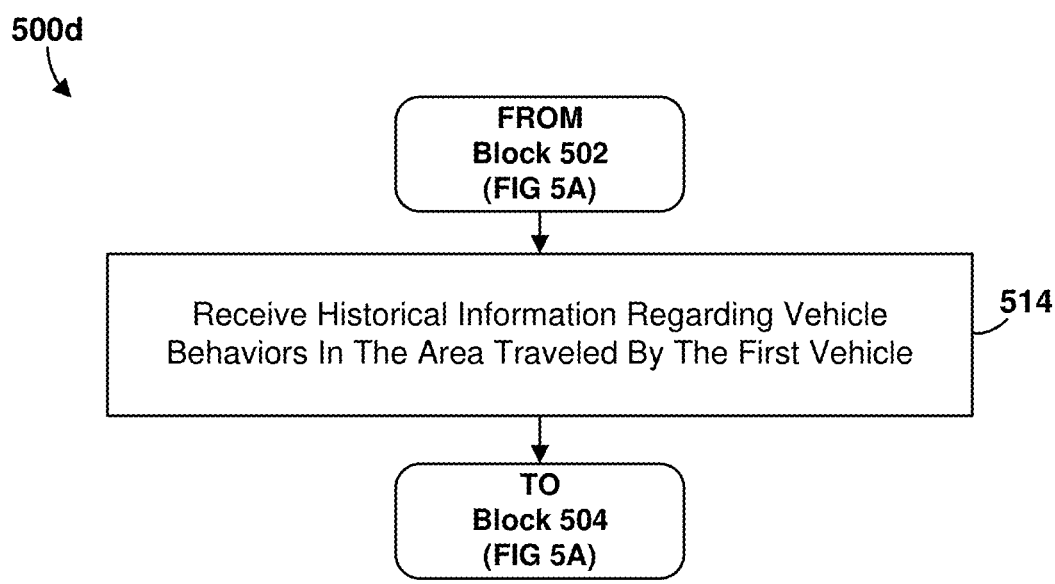

FIG. 5A is a process flow diagram of an example method 500a for managing vehicle behavior in accordance with various embodiments. FIGS. 5B-5D are process flow diagrams of example operations 500b-500e that may be performed as part of the method 500a for using a predicting future path of other vehicles in a vehicle control function in accordance with various embodiments. With reference to FIGS. 1A-5A, the method 500a and the operations thereof may be performed by a processor (e.g., 205) of a vehicle processing system or vehicle processor or V2X processing device (such as the vehicle processor 102, 104, 106, 204) that may be implemented in hardware elements, software elements, or a combination of hardware and software elements (referred to collectively as a "vehicle processor").

Referring to FIG. 5A, the vehicle processor may receive dynamic traffic flow feature information relevant to movements of a second vehicle within a predetermined proximity to the first vehicle in block 502. In some embodiments, receiving dynamic traffic flow feature information may include the vehicle processor receiving probabilities for each of a plurality of path options available to the second vehicle from a database. In some embodiments the vehicle processor receiving dynamic traffic flow feature information may include the vehicle processor receiving observation information related to movements of the second vehicle from sensors. In some embodiments, the dynamic traffic flow feature information may be received by the vehicle processor via V2X communications. In some embodiments, the dynamic traffic flow feature information may include contextual information relevant to the behavior and/or the intended behavior of the second vehicle.

In some embodiments, the dynamic traffic flow feature information may include one or more of information received from another vehicle, information perceived or obtained from a sensor of the host vehicle, HD map information, and/or environmental information observed by the host vehicle or other vehicles while moving. In some embodiments, the dynamic traffic flow feature information may include information about changes in traffic conditions or traffic flow, such as average lane speed(s), lane changes, braking behaviors, acceleration behaviors, exiting traffic, entering traffic, and/or the like. In some embodiments, the dynamic traffic flow feature information may include information about changes in the driving environment, such as lane closures, accidents, the presence of an emergency vehicle, and so forth, that may affect the behavior of other vehicles and or the flow of traffic (e.g., from a closed lane to an open lane). Means for performing the operations of block 502 may include the vehicle processing system 102, 104, 106, 204, the in-vehicle network 210, the radio module 218, the processor(s) 205, and the traffic flow feature module 322.

In block 504, the vehicle processor may determine probabilities of a plurality of potential behaviors of the second vehicle based on the dynamic traffic flow feature information received in block 502. The vehicle processor may take into account the received dynamic traffic flow feature information in determining the plurality of potential behaviors. In some embodiments, the plurality of potential behaviors of the second vehicle determined by the vehicle processor in block 504 may include more than one path option available to the second vehicle. In some embodiments, determining probabilities of the plurality of potential behaviors of the second vehicle based on the received dynamic traffic flow feature information by the vehicle processor may include determining the probabilities of the plurality of potential behaviors of the second vehicle taking into account the additional vehicle dynamic traffic flow feature information. In some embodiments, determining probabilities of a plurality of potential behaviors of the second vehicle based on the received dynamic traffic flow feature information by the vehicle processor may include determining the probabilities of the plurality of potential behaviors of the second vehicle taking into account the received probabilities of the potential behavior of the third vehicle. In some embodiments, determining probabilities of the plurality of potential behaviors of the second vehicle by the vehicle processor may include determining the probabilities of the plurality of potential behaviors of the second vehicle based on the received historical information. In some embodiments, determining probabilities of a plurality of potential behaviors of the second vehicle based on the received dynamic traffic flow feature information by the vehicle processor may include determining the probabilities of the plurality of potential behaviors of the second vehicle based on updated map feature information included in the received dynamic traffic flow feature information. In some embodiments, determining probabilities of a plurality of potential behaviors of the second vehicle based on the received dynamic traffic flow feature information by the vehicle processor may include determining the probabilities of the plurality of potential behaviors of the second vehicle using at least one of regression or classification models for predicted movements of vehicles surrounding the first vehicle. Means for performing the operations of block 504 may include the vehicle processing system 102, 104, 106, 204, the in-vehicle network 210, the processor(s) 205, and the behavior probability module 324.

In block 506, the vehicle processor may predict a future path of the second vehicle based on the determined probabilities of the plurality of potential behaviors of the second vehicle. Means for performing the operations of block 506 may include the vehicle processing system 102, 104, 106, 204, the in-vehicle network 210, the processor(s) 205, and the behavior prediction module 326.

In block 508, the vehicle processor may use the predicted future path of the second vehicle in a vehicle control function. In some embodiments, by the vehicle processor may use the predicted future path of the second vehicle in the vehicle control function to generate control commands for adjusting a behavior of the first vehicle, such as to perform a maneuver, adjust an ongoing maneuver, update or adjust path planning, etc. Means for performing the operations of block 508 may include the vehicle processing system 102, 104, 106, 204, the in-vehicle network 210, the processor(s) 205, and the behavior adjustment module 328.

FIGS. 5B-5D are process flow diagrams of example operations 510-514 that may be performed as part of the method 500a for managing vehicle behavior in accordance with various embodiments. The operations 510-514 may be performed by a processor (e.g., 205) of a vehicle processing system or vehicle processor or V2X processing device (such as the vehicle processor 102, 104, 106, 204) that may be implemented in hardware elements, software elements, or a combination of hardware and software elements (referred to collectively as a "vehicle processor").

FIG. 5B illustrates operations 510 of the method 500b that may be performed by a vehicle processor in accordance with some embodiments. With reference to FIGS. 1A-5B, following the operations in block 502 of the method 500a, the vehicle processor may receive additional vehicle dynamic traffic flow feature information that indicates movements of a third vehicle within the predetermined proximity to the first vehicle in block 510. In response to receiving additional vehicle dynamic traffic flow feature information in block 510, the processor may determine probabilities of a plurality of potential behaviors of the second vehicle based on the received dynamic traffic flow feature information in block 504 of the method 500a as described. Means for performing the operations of block 510 may include the vehicle processing system 102, 104, 106, 204, the in-vehicle network 210, the processor(s) 205, and the traffic flow feature module 322.

FIG. 5C illustrates operations 512 of the method 500c that may be performed by a vehicle processor in accordance with some embodiments. With reference to FIGS. 1A-5C, following the operations in block 502 of the method 500a, the vehicle processor may receive, from a V2X resource remote from the first vehicle, probabilities of potential behaviors of a third vehicle in block 512. In response to receiving the probabilities of potential behaviors of the third vehicle in block 512, the processor may determine probabilities of a plurality of potential behaviors of the second vehicle based on the received dynamic traffic flow feature information in block 504 of the method 500a as described. Means for performing the operations of block 510 may include the vehicle processing system 102, 104, 106, 204, the in-vehicle network 210, the processor(s) 205, and the traffic flow feature module 322.

FIG. 5D illustrates operations 514 of the method 500d that may be performed by a vehicle processor in accordance with some embodiments. With reference to FIGS. 1A-5D, following the operations in block 502 of the method 500a, the vehicle processor may receive historical information regarding vehicle behaviors in the area traveled by the first vehicle in block 514. In response to receiving the historical information in block 514, the processor may determine probabilities of a plurality of potential behaviors of the second vehicle based on the received dynamic traffic flow feature information in block 504 of the method 500a as described. Means for performing the operations of block 510 may include the vehicle processing system 102, 104, 106, 204, the in-vehicle network 210, the processor(s) 205, and the traffic flow feature module 322.

Figure 6A:
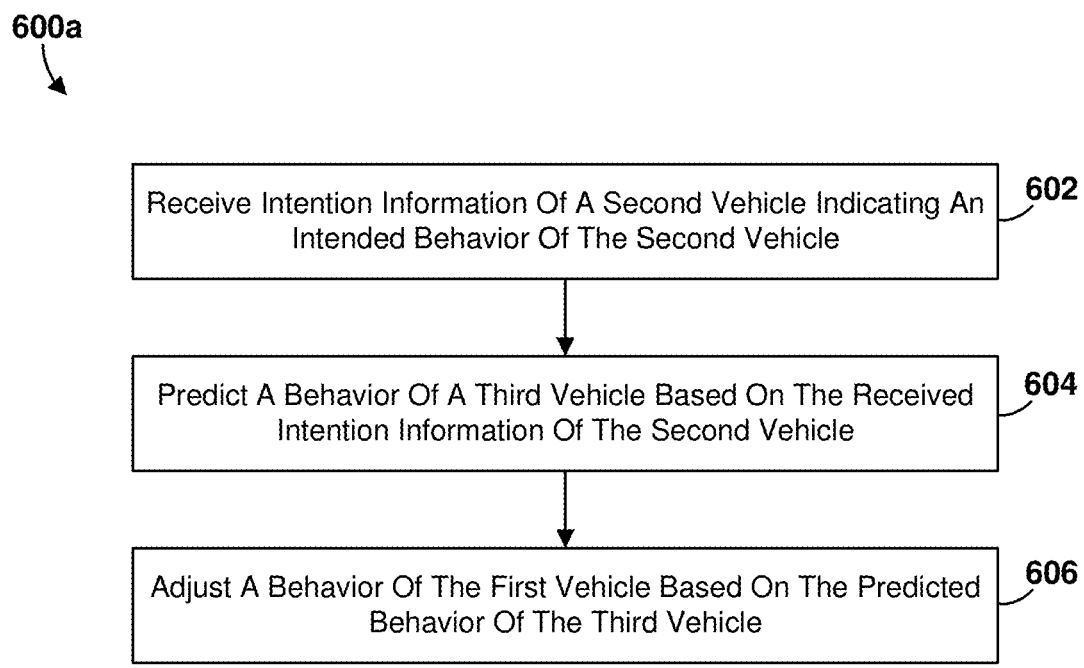
FIG. 6A is a process flow diagram of an example method for managing vehicle behavior in accordance with various embodiments.
Figure 6B:
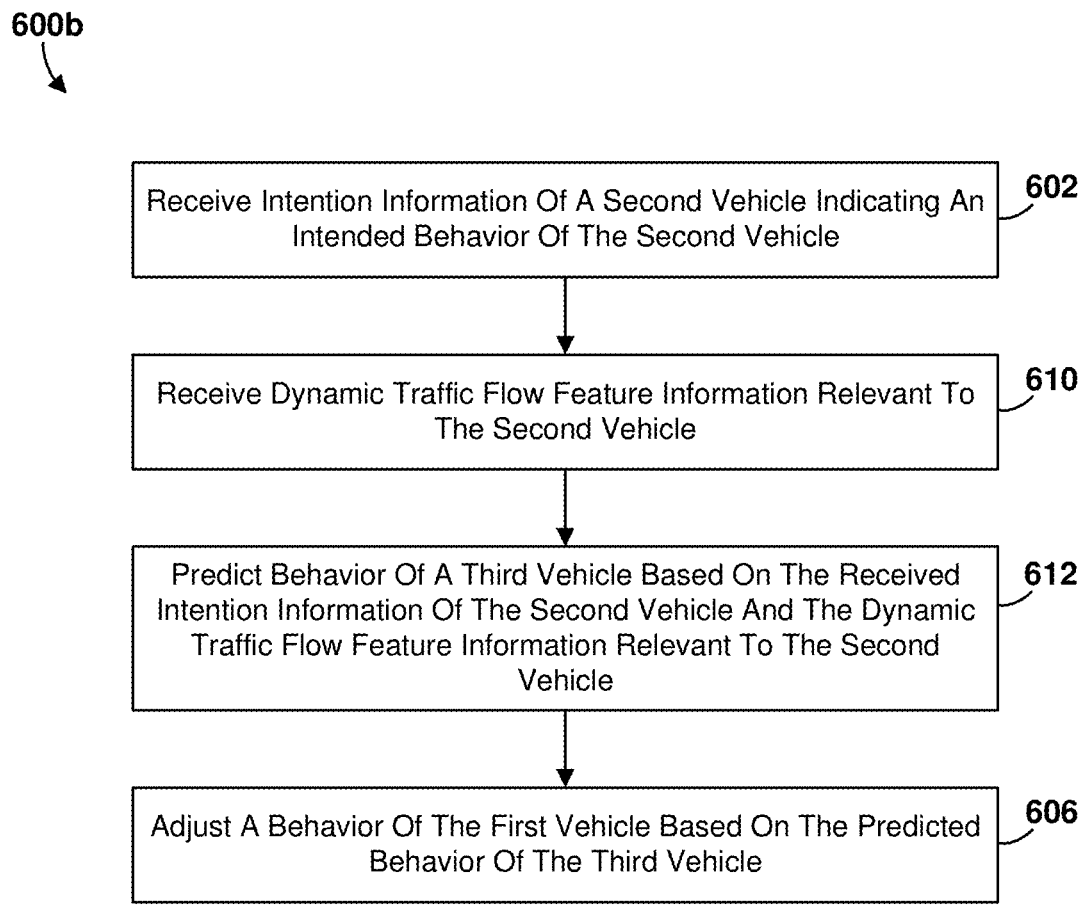
FIG. 6B is a process flow diagram of example operations that may be performed as part of the method for managing vehicle behavior in accordance with various embodiments

FIG. 6A is a process flow diagram of an example method 600a for managing vehicle behavior in accordance with various embodiments. FIG. 6B is a process flow diagram of example operations 600b that may be performed as part of the method 600a for managing vehicle behavior in accordance with various embodiments. With reference to FIGS. 1A-6B, the method 600a and the operations 600b may be performed by a processor (e.g., 205) of a vehicle processing system or vehicle processor or V2X processing device (such as the vehicle processor 102, 104, 106, 204) that may be implemented in hardware elements, software elements, or a combination of hardware and software elements (referred to collectively as a "vehicle processor").

Referring to FIG. 6A, the vehicle processor may receive intention information of the second vehicle indicating an intended behavior the second vehicle in block 602. In some embodiments, the vehicle processor may determine the intention information of the second vehicle from sensors information received by a sensor of the first vehicle, from a message (e.g., a V2X message) received by the first vehicle from the second vehicle, and/or from a message (e.g., a V2X message) received from a communication network (e.g., and RSU). Means for performing the operations of block 602 may include the vehicle processing system 102, 104, 106, 204, the in-vehicle network 210, the radio module 218, the processor(s) 205, and the traffic flow feature module 322.

In block 604, the vehicle processor may predict a behavior of a third vehicle based on the received intention information of the second vehicle. In some embodiments, the vehicle processor may apply the received intention information of the second vehicle to a prediction system (e.g., the prediction system 400) that may provide as an output a prediction of the behavior of the third vehicle. Means for performing the operations of block 604 may include the vehicle processing system 102, 104, 106, 204, the in-vehicle network 210, the processor(s) 205, the behavior probability module 224, and the behavior prediction module 326.

In block 606, the vehicle processor may adjust a behavior of the first vehicle based on the predicted behavior of the third vehicle. In some embodiments, the vehicle processor may perform a maneuver based on the predicted behavior of the third vehicle. In some embodiments, the vehicle processor may change an ongoing maneuver based on the predicted behavior of the third vehicle. In some embodiments, the vehicle processor may adjust a planned path of travel based on the predicted behavior of the third vehicle. For example, the vehicle processor may cancel a planned maneuver based on the predicted behavior of the third vehicle. As another example, the vehicle processor may perform maneuver (e.g., braking, swerving, changing lane, accelerating, etc.) based on the predicted behavior of the third vehicle. As yet another example, the vehicle processor may modify an ongoing maneuver based on the predicted behavior of the third vehicle. Means for performing the operations of block 606 may include the vehicle processing system 102, 104, 106, 204, the in-vehicle network 210, the processor(s) 205, the behavior probability module 224, and the behavior prediction module 326.

Referring to FIG. 6A, in some embodiments, after receiving the intention information of the second vehicle indicating an intended behavior the second vehicle in block 602 of the method 600a, the processor may receive dynamic traffic flow feature information relevant to the second vehicle in block 610. In some embodiments, the dynamic traffic flow feature information may include contextual information relevant to the behavior and/or the intended behavior of the second vehicle. In some embodiments, the dynamic traffic flow feature information may include one or more of information received (e.g., from another vehicle) or perceived (e.g., via a sensor), HD map information, and environmental information observed while driving. In some embodiments, the dynamic traffic flow feature information may include information about changes in traffic conditions or traffic flow, such as average lane speed(s), lane changes, braking behaviors, acceleration behaviors, exiting traffic, entering traffic, and/or the like. In some embodiments, the dynamic traffic flow feature information may include information about changes in the driving environment, such as lane closures, accidents, the presence of an emergency vehicle, and so forth, that may affect the behavior of other vehicles and or the flow of traffic (e.g., from a closed lane to an open lane). Means for performing the operations of block 610 may include the vehicle processing system 102, 104, 106, 204, the in-vehicle network 210, the radio module 218, the processor(s) 205, and the traffic flow feature module 322.

In block 612, the vehicle processor may predict the behavior of the third vehicle based on the received intention information of the second vehicle and the dynamic traffic flow feature information relevant to the second vehicle. Means for performing the operations of block 612 may include the vehicle processing system 102, 104, 106, 204, the in-vehicle network 210, the processor(s) 205, the behavior probability module 324, and the behavior prediction module 326.

The vehicle processor may adjust a behavior of the first vehicle based on the predicted behavior of the third vehicle in block 606 as described.

Implementation examples are described in the following paragraphs. While some of the following implementation examples are described in terms of example methods, further example implementations may include: the example methods discussed in the following paragraphs implemented by a vehicle processing device that may be an on-board unit, mobile device unit, mobile computing unit, or stationary roadside unit including a processor configured with processor-executable instructions to perform operations of the methods of the following implementation examples; the example methods discussed in the following paragraphs implemented by a vehicle processing device including means for performing functions of the methods of the following implementation examples; and the example methods discussed in the following paragraphs may be implemented as a non-transitory processor-readable storage medium having stored thereon processor-executable instructions configured to cause a processor of a vehicle processing device to perform the operations of the methods of the following implementation examples.

Example 1. A method performed by a processor of a first vehicle for using a predicting future path of other vehicles in a vehicle control function, including receiving dynamic traffic flow feature information relevant to movements of a second vehicle within a predetermined proximity to the first vehicle, determining probabilities of a plurality of potential behaviors of the second vehicle based on the received dynamic traffic flow feature information, in which each of the plurality of potential behaviors take into account the received dynamic traffic flow feature information, predicting a future path of the second vehicle based on the determined probabilities of the plurality of potential behaviors of the second vehicle, and using the predicted future path of the second vehicle in a vehicle control function.

Example 2. The method of example 1, further including receiving additional vehicle dynamic traffic flow feature information that indicates movements of a third vehicle within the predetermined proximity to the first vehicle, in which determining probabilities of the plurality of potential behaviors of the second vehicle based on the received dynamic traffic flow feature information includes determining the probabilities of the plurality of potential behaviors of the second vehicle taking into account the additional vehicle dynamic traffic flow feature information.

Example 3. The method of example 2, in which using the predicted future path of the second vehicle in the vehicle control function includes adjusting a behavior of the first vehicle.

Example 4. The method of any of claims 1-4, further including receiving, from a vehicle-to-everything (V2X) resource remote from the first vehicle, probabilities of potential behaviors of a third vehicle, in which determining probabilities of a plurality of potential behaviors of the second vehicle based on the received dynamic traffic flow feature information includes determining the probabilities of the plurality of potential behaviors of the second vehicle taking into account the received probabilities of the potential behavior of the third vehicle.

Example 5. The method of claim 1, in which the plurality of potential behaviors of the second vehicle include more than one path option available to the second vehicle.

Example 6. The method of any of claims 1-5, further including receiving historical information regarding vehicle behaviors in the area traveled by the first vehicle, in which determining probabilities of the plurality of potential behaviors of the second vehicle includes determining the probabilities of the plurality of potential behaviors of the second vehicle based on the received historical information.

Example 7. The method of any of claims 1-6, in which receiving dynamic traffic flow feature information further includes receiving, from a database, probabilities for each of a plurality of path options available to the second vehicle, and receiving, from sensors, observation information related to movements of the second vehicle.

Example 8. The method of any of claims 1-7, in which the received dynamic traffic flow feature information is received via vehicle-to-everything (V2X) communications.

Example 9. The method of any of claims 1-8, in which determining probabilities of a plurality of potential behaviors of the second vehicle based on the received dynamic traffic flow feature information includes determining the probabilities of the plurality of potential behaviors of the second vehicle based on updated map feature information included in the received dynamic traffic flow feature information.

Example 10. The method of any of claims 1-9, in which determining probabilities of a plurality of potential behaviors of the second vehicle based on the received dynamic traffic flow feature information includes determining the probabilities of the plurality of potential behaviors of the second vehicle using at least one of regression or classification models for predicted movements of vehicles surrounding the first vehicle.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a first vehicle for using a predicted future path of other vehicles in a vehicle control function, comprising:
   receiving dynamic traffic flow feature information relevant to movements of a second vehicle within a predetermined proximity to the first vehicle, wherein the dynamic traffic flow feature information includes historical information regarding a particular location that corresponds to a position of the second vehicle, wherein the historical information includes past vehicle behaviors in the particular location on a roadway;
   receiving, from a third vehicle, intention information of the third vehicle indicating an intended behavior of the third vehicle, wherein the intention information of the third vehicle is received via a vehicle-to-everything (V2X) resource;
   determining probabilities of a plurality of potential behaviors of the second vehicle based on the received dynamic traffic flow feature information and the intention information of the third vehicle, wherein each of the plurality of potential behaviors take into account the received dynamic traffic flow feature information and the intention information of the third vehicle;
   predicting a future path of the second vehicle based on the determined probabilities of the plurality of potential behaviors of the second vehicle; and
   using the predicted future path of the second vehicle in a vehicle control function.

2. The method of claim 1, further comprising:
   receiving additional vehicle dynamic traffic flow feature information that indicates movements of a third vehicle within the predetermined proximity to the first vehicle,
   wherein determining probabilities of the plurality of potential behaviors of the second vehicle based on the received dynamic traffic flow feature information comprises determining the probabilities of the plurality of potential behaviors of the second vehicle taking into account the additional vehicle dynamic traffic flow feature information.

3. The method of claim 2, wherein using the predicted future path of the second vehicle in the vehicle control function includes adjusting a behavior of the first vehicle.

4. The method of claim 1, wherein the plurality of potential behaviors of the second vehicle include more than one path option available to the second vehicle.

5. The method of claim 1, further comprising:
receiving the historical information as dynamic traffic flow feature information regarding past vehicle behaviors in a map area traveled by the first vehicle,
wherein determining probabilities of the plurality of potential behaviors of the second vehicle comprises determining the probabilities of the plurality of potential behaviors of the second vehicle based on the received historical information.

6. The method of claim 1, wherein receiving dynamic traffic flow feature information further comprises:
receiving, from a database, probabilities for each of a plurality of path options available to the second vehicle; and
receiving, from sensors, observation information related to movements of the second vehicle.

7. The method of claim 1, wherein the received dynamic traffic flow feature information is received via vehicle-to-everything (V2X) communications.

8. The method of claim 1, wherein determining probabilities of a plurality of potential behaviors of the second vehicle based on the received dynamic traffic flow feature information comprises determining the probabilities of the plurality of potential behaviors of the second vehicle based on updated map environment feature information included in the received dynamic traffic flow feature information.

9. The method of claim 1, wherein determining probabilities of a plurality of potential behaviors of the second vehicle based on the received dynamic traffic flow feature information comprises determining the probabilities of the plurality of potential behaviors of the second vehicle using at least one of regression or classification models for predicted movements of vehicles surrounding the first vehicle.

10. A vehicle processing device of a first vehicle, comprising:
a processor configured with processor-executable instructions to:
receive dynamic traffic flow feature information relevant to movements of a second vehicle within a predetermined proximity to the first vehicle, wherein the dynamic traffic flow feature information includes historical information regarding a particular location that corresponds to a position of the second vehicle, wherein the historical information includes past vehicle behaviors in the particular location on a roadway;
receive, from a third vehicle, intention information of the third vehicle indicating an intended behavior of the third vehicle, wherein the intention information of the third vehicle is received via a vehicle-to-everything (V2X) resource;
determine probabilities of a plurality of potential behaviors of the second vehicle based on the received dynamic traffic flow feature information and the intention information of the third vehicle, wherein each of the plurality of potential behaviors take into account the received dynamic traffic flow feature information and the intention information of the third vehicle;
predict a future path of the second vehicle based on the determined probabilities of the plurality of potential behaviors of the second vehicle; and
use the predicted future path of the second vehicle in a vehicle control function.

11. The vehicle processing device of claim 10, wherein the processor is further configured with processor-executable instructions to:
receive additional vehicle dynamic traffic flow feature information that indicates movements of a third vehicle within the predetermined proximity to the first vehicle; and
determine the probabilities of the plurality of potential behaviors of the second vehicle taking into account the additional vehicle dynamic traffic flow feature information.

12. The vehicle processing device of claim 11, wherein the processor is further configured with processor-executable instructions to adjust a behavior of the first vehicle.

13. The vehicle processing device of claim 10, wherein the processor is further configured with processor-executable instructions such that the plurality of potential behaviors of the second vehicle include more than one path option available to the second vehicle.

14. The vehicle processing device of claim 10, wherein the processor is further configured with processor-executable instructions to:
receiving the historical information as dynamic traffic flow feature information regarding past vehicle behaviors in a map area traveled by the first vehicle; and
determine the probabilities of the plurality of potential behaviors of the second vehicle based on the received historical information.

15. The vehicle processing device of claim 10, wherein the processor is further configured with processor-executable instructions to:
receive, from a database, probabilities for each of a plurality of path options available to the second vehicle; and
receive, from sensors, observation information related to movements of the second vehicle.

16. The vehicle processing device of claim 10, wherein the processor is further configured with processor-executable instructions to receive the dynamic traffic flow feature information via vehicle-to-everything (V2X) communications.

17. The vehicle processing device of claim 10, wherein the processor is further configured with processor-executable instructions to determine the probabilities of the plurality of potential behaviors of the second vehicle based on updated map environment feature information included in the received dynamic traffic flow feature information.

18. The vehicle processing device of claim 10, wherein the processor is further configured with processor-executable instructions to determine the probabilities of the plurality of potential behaviors of the second vehicle using at least one of regression or classification models for predicted movements of vehicles surrounding the first vehicle.

19. A vehicle processing device of a first vehicle, comprising:
means for receiving dynamic traffic flow feature information relevant to movements of a second vehicle within a predetermined proximity to the first vehicle, wherein the dynamic traffic flow feature information includes historical information regarding a particular location that corresponds to a position of the second vehicle, wherein the historical information includes past vehicle behaviors in the particular location on a roadway;
means for receiving, from a third vehicle, intention information of the third vehicle indicating an intended behavior of the third vehicle, wherein the intention information of the third vehicle is received via a vehicle-to-everything (V2X) resource;
means for determining probabilities of a plurality of potential behaviors of the second vehicle based on the received dynamic traffic flow feature information and the intention information of the third vehicle, wherein each of the plurality of potential behaviors take into account the received dynamic traffic flow feature information and the intention information of the third vehicle;

means for predicting a future path of the second vehicle based on the determined probabilities of the plurality of potential behaviors of the second vehicle; and means for using the predicted future path of the second vehicle in a vehicle control function.

20. The vehicle processing device of claim 19, further comprising:

means for receiving additional vehicle dynamic traffic flow feature information that indicates movements of a third vehicle within the predetermined proximity to the first vehicle, wherein means for determining probabilities of the plurality of potential behaviors of the second vehicle based on the received dynamic traffic flow feature information comprises means for determining the probabilities of the plurality of potential behaviors of the second vehicle taking into account the additional vehicle dynamic traffic flow feature information.

21. The vehicle processing device of claim 20, wherein means for using the predicted future path of the second vehicle in the vehicle control function includes means for adjusting a behavior of the first vehicle.

22. The vehicle processing device of claim 19, wherein the plurality of potential behaviors of the second vehicle include more than one path option available to the second vehicle.

23. The vehicle processing device of claim 19, further comprising:

means for receiving the historical information as dynamic traffic flow feature information regarding past vehicle behaviors in a map area traveled by the first vehicle, wherein means for determining probabilities of the plurality of potential behaviors of the second vehicle comprises means for determining the probabilities of the plurality of potential behaviors of the second vehicle based on the received historical information.

24. The vehicle processing device of claim 19, wherein means for receiving dynamic traffic flow feature information further comprises:

means for receiving, from a database, probabilities for each of a plurality of path options available to the second vehicle; and means for receiving, from sensors, observation information related to movements of the second vehicle.

25. The vehicle processing device of claim 19, wherein the received dynamic traffic flow feature information is received via vehicle-to-everything (V2X) communications.

26. The vehicle processing device of claim 19, wherein means for determining probabilities of a plurality of potential behaviors of the second vehicle based on the received dynamic traffic flow feature information comprises means for determining the probabilities of the plurality of potential behaviors of the second vehicle based on updated map feature information included in the received dynamic traffic flow feature information.

27. The vehicle processing device of claim 19, wherein means for determining probabilities of a plurality of potential behaviors of the second vehicle based on the received dynamic traffic flow feature information comprises means for determining the probabilities of the plurality of potential behaviors of the second vehicle using at least one of regression or classification models for predicted movements of vehicles surrounding the first vehicle.

* * * * *